US011743276B2

(12) United States Patent
Wosotowsky et al.

(10) Patent No.: US 11,743,276 B2
(45) Date of Patent: *Aug. 29, 2023

(54) METHODS, SYSTEMS, ARTICLES OF MANUFACTURE AND APPARATUS FOR PRODUCING GENERIC IP REPUTATION THROUGH CROSS PROTOCOL ANALYSIS

(71) Applicant: McAfee, LLC, San Jose, CA (US)

(72) Inventors: Adam Wosotowsky, Lilburn, GA (US); Yonghong Huang, Hillsboro, OR (US); Eric Peterson, Elizabeth, CO (US); John Wagener, West Lakeland, MN (US); Joanna Negrete, Santa Clara, CA (US); Armando Rodriguez, Parker, CO (US); Celeste Fralick, Lubbock, TX (US); Sandeep Chandana, Santa Clara, CA (US)

(73) Assignee: McAfee, LLC, San Jose, CA (US)

( * ) Notice: Subject to any disclaimer, the term of this patent is extended or adjusted under 35 U.S.C. 154(b) by 234 days.

This patent is subject to a terminal disclaimer.

(21) Appl. No.: 17/356,464

(22) Filed: Jun. 23, 2021

(65) Prior Publication Data

US 2021/0320934 A1 Oct. 14, 2021

Related U.S. Application Data

(63) Continuation of application No. 16/505,969, filed on Jul. 9, 2019, now Pat. No. 11,070,572.

(51) Int. Cl.
*H04L 51/212* (2022.01)
*H04L 9/40* (2022.01)
*G06N 20/00* (2019.01)

(52) U.S. Cl.
CPC ......... *H04L 63/1416* (2013.01); *G06N 20/00* (2019.01); *H04L 63/0236* (2013.01);
(Continued)

(58) Field of Classification Search
CPC ............. H04L 63/1416; H04L 63/0236; H04L 63/1425; H04L 51/212; H04L 63/1466; G06N 20/00
See application file for complete search history.

(56) References Cited

U.S. PATENT DOCUMENTS 7,424,489 B1 9/2008 Duffield et al.
7,469,418 B1 12/2008 Wilkinson et al.
(Continued)

OTHER PUBLICATIONS

"Appendix C. Common Ports", Red Hat Enterprise Linux 4: Security Guide, 2005, obtained online from <httos:/Aveb.mit.edu/rhel-doc/4/RH-DOCS/rhel-sg-en-4/ch-ports.html>, retrieved on Feb. 16, 2020 (Year: 2005).*
(Continued)

*Primary Examiner* — Farid Homayounmehr
*Assistant Examiner* — Zhimei Zhu
(74) *Attorney, Agent, or Firm* — Hanley, Flight & Zimmerman, LLC

(57) ABSTRACT

Methods, apparatus, systems and articles of manufacture for producing generic Internet Protocol (IP) reputation through cross-protocol analysis are disclosed. An example apparatus includes a data collector to gather a first data set representing IP telemetry data for a first protocol, the data collector to gather a second data set representing IP telemetry data for a second protocol different from the first protocol. A label generator is to generate a training data set based on records in the first data set and the second data set having matching IP addresses, the training data set to include combined label indicating whether each of the respective matching IP addresses is malicious. A model trainer is to train a machine learning model using the training data set. A model executor is to, responsive to a request from a client device, execute the machine learning model to determine whether a requested IP address is malicious.

20 Claims, 9 Drawing Sheets

(52) U.S. Cl.
CPC ........ *H04L 63/1425* (2013.01); *H04L 51/212* (2022.05); *H04L 63/1466* (2013.01)

(56) References Cited

U.S. PATENT DOCUMENTS

| | | | |
|---|---|---|---|
| 8,205,239 B1 | 6/2012 | Satish | |
| 8,578,497 B2 | 11/2013 | Antonakakis et al. | |
| 8,631,489 B2 | 1/2014 | Antonakakis et al. | |
| 8,682,812 B1 | 3/2014 | Ranjan | |
| 8,762,298 B1 | 6/2014 | Ranjan et al. | |
| 9,043,894 B1 | 5/2015 | Dennison et al. | |
| 9,154,516 B1* | 10/2015 | Vaystikh | H04L 63/1425 |
| 9,654,485 B1 | 5/2017 | Neumann | |
| 9,690,938 B1 | 6/2017 | Saxe et al. | |
| 9,749,336 B1 | 8/2017 | Zhang et al. | |
| 10,282,546 B1 | 5/2019 | Parikh et al. | |
| 10,681,080 B1 | 6/2020 | Chen | |
| 2003/0065926 A1 | 4/2003 | Schultz et al. | |
| 2008/0082352 A1 | 4/2008 | Schmidtler et al. | |
| 2008/0086432 A1 | 4/2008 | Schmidtler et al. | |
| 2008/0086433 A1 | 4/2008 | Schmidtler et al. | |
| 2008/0097936 A1 | 4/2008 | Schmidtler et al. | |
| 2008/0184366 A1* | 7/2008 | Alperovitch | H04L 51/212 709/206 |
| 2010/0115040 A1* | 5/2010 | Sargent | H04L 51/42 709/206 |
| 2012/0210423 A1 | 8/2012 | Friedrichs et al. | |
| 2013/0139261 A1 | 5/2013 | Friedrichs et al. | |
| 2014/0090061 A1 | 3/2014 | Avasarala et al. | |
| 2015/0058976 A1 | 2/2015 | Carney et al. | |
| 2015/0067081 A1 | 3/2015 | Howard et al. | |
| 2015/0180892 A1 | 6/2015 | Balderas | |
| 2015/0215334 A1* | 7/2015 | Bingham | H04L 63/1425 726/23 |
| 2016/0036836 A1 | 2/2016 | Grill et al. | |
| 2016/0044054 A1 | 2/2016 | Stiansen et al. | |
| 2016/0154960 A1 | 6/2016 | Sharma et al. | |
| 2016/0335435 A1 | 11/2016 | Schmidtler et al. | |
| 2016/0337384 A1 | 11/2016 | Jansson et al. | |
| 2017/0228658 A1 | 8/2017 | Lim | |
| 2017/0262633 A1 | 9/2017 | Miserendino et al. | |
| 2018/0004948 A1 | 1/2018 | Martin et al. | |
| 2018/0097828 A1 | 4/2018 | Coskun | |
| 2018/0203998 A1 | 7/2018 | Maisel et al. | |
| 2018/0232523 A1* | 8/2018 | Copty | G06N 7/023 |
| 2018/0300475 A1 | 10/2018 | Zhang et al. | |
| 2018/0322410 A1 | 11/2018 | McLean et al. | |
| 2018/0324193 A1* | 11/2018 | Ronen | G06N 20/00 |
| 2018/0330599 A1 | 11/2018 | Burke et al. | |
| 2019/0041822 A1 | 2/2019 | Burke et al. | |
| 2019/0042743 A1 | 2/2019 | Chen | |
| 2019/0042745 A1 | 2/2019 | Chen et al. | |
| 2019/0052652 A1 | 2/2019 | Takahashi et al. | |
| 2019/0065744 A1 | 2/2019 | Gaustad | |
| 2019/0080089 A1 | 3/2019 | Chen | |
| 2019/0087574 A1 | 3/2019 | Schmidtler et al. | |
| 2019/0171178 A1 | 6/2019 | Burke et al. | |
| 2019/0251251 A1 | 8/2019 | Carson | |
| 2019/0260801 A1 | 8/2019 | Reddy et al. | |
| 2019/0272375 A1 | 9/2019 | Chen | |
| 2019/0311121 A1 | 10/2019 | Martin et al. | |
| 2020/0089882 A1 | 3/2020 | Menahem et al. | |
| 2020/0175164 A1 | 6/2020 | Nataraj et al. | |
| 2020/0210575 A1 | 7/2020 | Huang et al. | |
| 2021/0014247 A1 | 1/2021 | Wosotowsky et al. | |

OTHER PUBLICATIONS

United States Patent and Trademark Office, "Non-Final Office Action," dated Oct. 23, 2019 in connection with U.S. Appl. No. 16/505,969, 21 pages.

United States Patent and Trademark Office, "Final Office Action," dated Feb. 20, 2020 in connection with U.S. Appl. No. 16/505,969, 33 pages.

United States Patent and Trademark Office, "Advisory Action," dated Jun. 19, 2020 in connection with U.S. Appl. No. 16/505,969, 3 pages.

United States Patent and Trademark Office, "Non-Final Office Action," dated Jul. 16, 2020 in connection with U.S. Appl. No. 16/505,969, 22 pages.

United States Patent and Trademark Office, "Final Office Action," dated Nov. 23, 2020 in connection with U.S. Appl. No. 16/505,969, 25 pages.

United States Patent and Trademark Office, "Advisory Action," dated Feb. 5, 2021 in connection with U.S. Appl. No. 16/505,969, 3 pages.

United States Patent and Trademark Office, "Notice of Allowance," dated Mar. 10, 2021 in connection with U.S. Appl. No. 16/505,969, 18 pages.

Information Security Office, "Aggressive IP Distribution (AID) List" retrieved from https://security.berkeley.edu/services/aggressive-ip-distribution-aid-list, (2 pages).

Ring et al., "IP2Vec: Learning Similarities between IP Addresses", 2017 IEEE International Conference on Data Mining Workshops, retrieved from https://ieeexplore.ieee.org/document/8215725#target-Text=The%20key%20idea%20is%20to,public%20flow-based%20data%20sets, (10 pages).

Huang et al., "Large Scale Graph Mining for Web Reputation Inference", 2015 IEEE International Workshop on Machine Learning For Signal Processing Sep. 17-20, 2015, retrieved from https://ieeexplore.ieee.org/document/7324374, (6 pages).

Gharibshah., "Mining actionable information from security forums: the case of malicious IP addresses", Apr. 15, 2018, retrived from https://arxiv.org/abs/1804.04800, (10 pages).

Gharibshah., "RIPEx: Extration malicious IP addresses from security forums using cross-forum learning", Apr. 13, 2018, relieved from https://arxiv.org/abs/1804.04760, (12 pages).

Red Hat Customer Portal, "Appendix C. Common Ports," Red Hat Enterprise Linux 4: Security Guide, retrieved from <https://web.mit.edu/rhel-doc/4/RH-DOCS/rhel-sg-en-4/ch-ports.html> on Feb. 16, 2020, 13 pages.

* cited by examiner

500

| | 504 FIRST LABEL | 506 SECOND LABEL | 508 COMBINED LABEL | 510 LABEL CONFIDENCE |
|---|---|---|---|---|
| 521 | Benign | Benign | Benign | 1 |
| 522 | Malicious | Malicious | Malicious | 1 |
| 523 | Unknown | Unknown | Unknown | 1 |
| 524 | Benign | Unknown | Benign | 0.5 |
| 525 | Malicious | Unknown | Malicious | 0.5 |
| 526 | Unknown | Benign | Benign | 0.5 |
| 527 | Unknown | Malicious | Malicious | 0.5 |
| 528 | Benign | Malicious | Unknown | 0.5 |
| 529 | Malicious | Benign | Unknown | 0.5 |

METHODS, SYSTEMS, ARTICLES OF MANUFACTURE AND APPARATUS FOR PRODUCING GENERIC IP REPUTATION THROUGH CROSS PROTOCOL ANALYSIS

RELATED APPLICATION

This patent arises from a continuation of U.S. patent application Ser. No. 16/505,969, entitled "Methods, Systems, Articles of Manufacture and Apparatus for Producing Generic IP Reputation Through Cross-Protocol Analysis," which was filed on Jul. 9, 2019, and which is incorporated herein in its entirety.

FIELD OF THE DISCLOSURE

This disclosure relates generally to Internet Protocol (IP) reputation, and, more particularly, to methods, systems, articles of manufacture, and apparatus for producing generic IP reputation through cross-protocol analysis.

BACKGROUND

In recent years, IP reputation systems have been used to prevent malware, viruses, and other threats causing damage when they come from known malicious IP addresses. IP reputation systems give a known IP address a label that indicates whether the specified IP address can be trusted. If an IP address has a history for sending malicious data, viruses, or other spam, the reputation of the IP address can be labelled as malicious, or some other equivalent label, and any data being received from the specified IP address can be blocked before reaching a computer, server, or some other Internet-connected device where the malicious data would be able to cause harm.

BRIEF DESCRIPTION OF THE DRAWINGS

FIG. 5 is a table including input and output labels for the behavioral IP data generated using the example machine readable instructions of FIG. 4.

The figures are not to scale. Instead, the thickness of the layers or regions may be enlarged in the drawings. In general, the same reference numbers will be used throughout the drawing(s) and accompanying written description to refer to the same or like parts.

Figure 1:
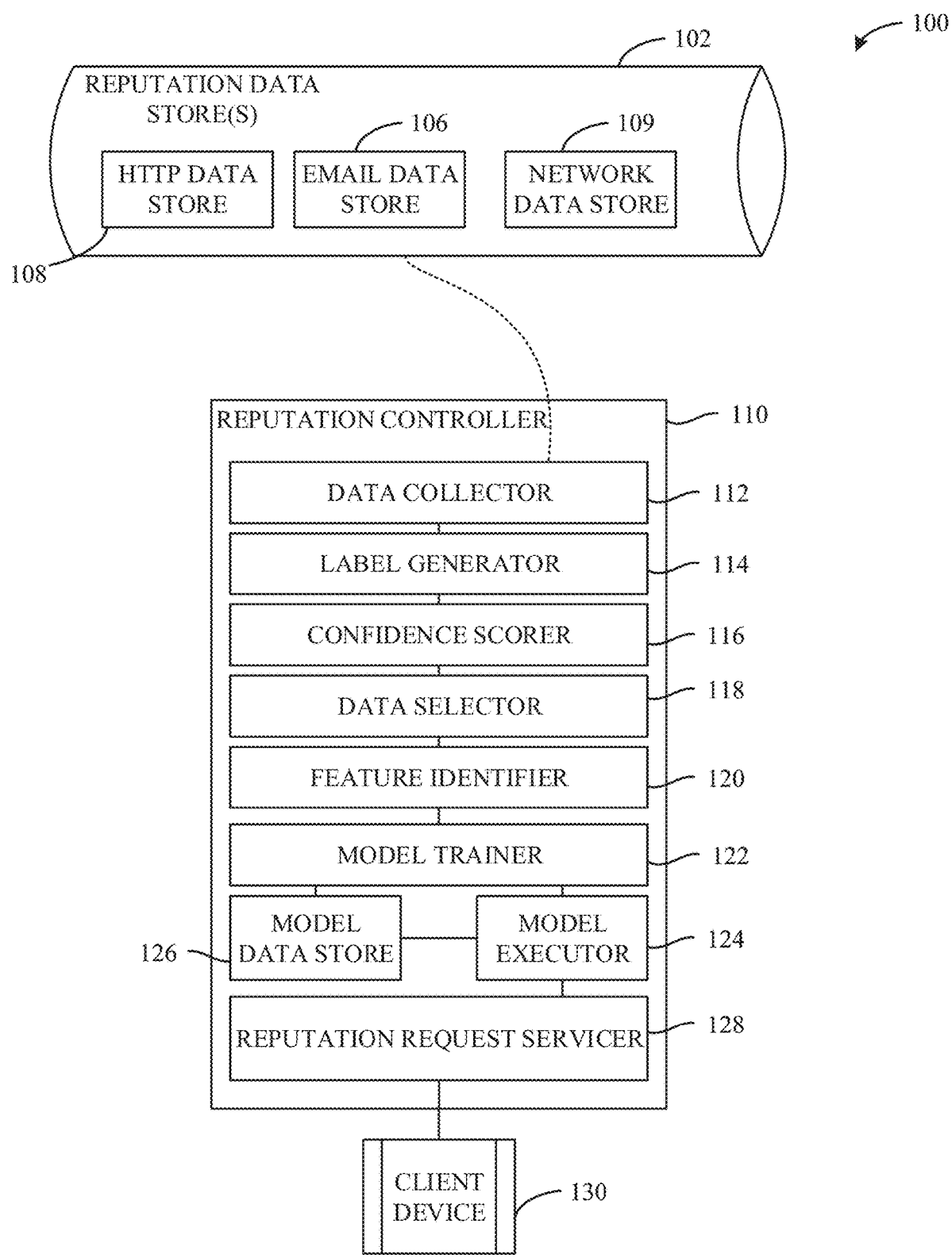
FIG. 1 is a block diagram representation of an example system including a reputation controller in which the teachings of this disclosure may be implemented.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Protocol specific IP reputation systems provide value to the specific protocol they are designed to protect. However, such protocol specific IP reputation systems (e.g., an HTTP request filter) often cannot be directly applied generically across other protocols (e.g., an email filter) interacting with an IP address because such use of an IP reputation system tends to lead to over-blocking and/or false positives. By leveraging multiple protocol specific reputations, a more generalized IP reputation can be created and applied to other protocols and, thus, improve protection against malicious communications and/or activities. By leveraging features generated from messages associated with HTTP communications and, separately, from email communications, the combinatorial effect of these features results in a reduction of error rate seen with additive solutions.

Most blocklists are applicable to a limited number of defensive uses but are not applicable globally. For example, an IP address in a residential geographic region should not be directly sending email (e.g., originating Simple Mail Transfer Protocol (SMTP) communications), so that IP address should be blocked by default if that IP address attempts to do so. However, an IP address in a residential geographic region is exactly the kind of candidate that should be browsing the web (e.g., transmitting HTTP messages) and, therefore, should not be blocked.

There are also scenarios where a positively identified malware infection and/or machine compromise would render communications originating from that IP address suspect regardless of the activity. Previous implementations for IP blocking systems either take a blocklist generated by a single protocol to be applied universally and are subject to unintended false positives (e.g., HTTP traffic being blocked from an IP address when only email communications needed to be blocked) or rely on specific heuristic triggers to react to predefined behaviors to generate a block and are, therefore, subject to false negatives due to reaction time or incomplete telemetry. In many cases, this results in generating separate blocklists based on IP, domain name, and/or protocol.

Example approaches disclosed herein are extensible and allow for use of additional data sets with minimal effort to help enhance IP reputation accuracy. Such automated detection is not beholden to rules specifically crafted to target one type of issue and/or protocol. Such an approach enables higher-confidence blocking classifications than other solutions. By using machine learning, example approaches disclosed herein can also identify "trusted" and/or "gateway" classifications, that prevent future false positives that would occur in a purely heuristic method of identifying traffic.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a Random Forest Model is used. Using a Random Forest model enables a trainer to input behavioral data concerning a specified Internet Protocol (IP) and the Random Forest will determine the likelihood of the IP of being malicious. In general, machine learning models/architectures that are suitable to use in the example approaches disclosed herein will enable output of a score and/or classification of whether a set of features represent a malicious IP address. However, other types of machine learning models could additionally or alternatively be used such as artificial neural networks, decision trees, support vector machines, genetic algorithms, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In some examples disclosed herein, ML/AI models are trained using ensemble trees. However, any other training algorithm may additionally or alternatively be used. In some examples disclosed herein, training is performed until a threshold amount of error is achieved (e.g., less than 2% error). In examples disclosed herein, training of the ML/AI models is performed at a central facility (e.g., a cloud computing server, etc.). In other examples disclosed herein, the training of the ML/AI models can be performed at any other suitable location. In some examples disclosed herein, training of the ML/AI models is performed using hyperparameters that control how the learning is performed (e.g., a learning rate, a number of layers to be used in the machine learning model, etc.). In some examples disclosed herein, hyperparameters that control the number of nodes in the machine learning model, the learning rate, etc. are used when training the ML/AI models. Such hyperparameters are selected by, for example, determining the optimal parameters through a grid search, etc. In some examples disclosed herein, re-training of the ML/AI models is performed. In such examples disclosed herein, the re-training may be performed in response to new IP addresses and IP addresses becoming more, or less, malicious over time.

In some examples disclosed herein, training of ML/AI models is performed using training data. In some examples disclosed herein, the training data originates from IP behavioral data sources (e.g., HTTP, email, domain name service (DNS), etc.). In some examples disclosed, the training data is labeled (e.g., reviewed and classified prior to training, etc.) to facilitate supervised training. In such examples disclosed herein, labeling is applied to the training data by evaluating the reputation of the IP through the IP behavioral data sources and comparing the labels generated for each of the IP behavioral data sources. In such examples, the generated labels are combined into a general label for the IP address. The general label is given a confidence rating based on if the labels matched each other.

In some examples disclosed herein, the training data is pre-processed using, for example, IP comparisons to remove non-unique IP addresses and to ensure all IPs are unique. In some examples disclosed herein, the training data is subdivided into the different IP behavioral data sources.

In some examples disclosed herein, the model is deployed for use as an executable construct that processes an input and provides an output after the training is completed. In some examples disclosed herein, the model is stored at a centralized reputation controller. In some examples disclosed herein, the model may then be executed by the model executor. In some examples disclosed herein, the model executor compares the IP of the incoming data to the IPs in the model feature list that has been created by the model trainer.

In some examples disclosed herein, the deployed model may be operated in an inference phase to process data. In such examples, the data to be analyzed (e.g., live data, etc.) is input to the model, and the model executes to create an output based on the input data. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples disclosed herein, the output of the deployed model is captured and provided as feedback. By analyzing the feedback, the accuracy of the deployed model can be determined. In some examples, disclosed herein, if the feedback indicates that the accuracy of the deployed model is less than a threshold or other criterion, training of an updated model is triggered using the feedback and updated training data set, hyperparameters, etc., to generate an updated, deployed model.

FIG. 1 is a block diagram of an example system 100 for generating an IP reputation through cross-protocol analysis. The example system 100 of FIG. 1 includes an example reputation data store(s) 102, an example reputation controller 110, and an example client device 130. In the illustrated example of FIG. 1, the example reputation datastore(s) 102 an example email data store 106, an example HTTP data store 108, an example network data store 109. The example reputation controller 110 includes an example data collector 112, an example label generator 114, an example confidence scorer 116, an example data selector 118, an example feature identifier 120, an example model trainer 122, an example model executor 124, an example model data store 126, an example reputation request servicer 128.

The example reputation data store 102 of the illustrated example of FIG. 1 is implemented by any memory, storage device and/or storage disc for storing data such as, for example, flash memory, magnetic media, optical media, solid state memory, hard drive(s), thumb drive(s), etc. Furthermore, the data stored in the example reputation data store 102 may be in any data format such as, for example, binary data, comma delimited data, tab delimited data, structured query language (SQL) structures, etc. While, in the illustrated example, the reputation data store 102 is illustrated as a single device, the example reputation data store 102 and/or any other data storage devices described herein may be implemented by any number and/or type(s) of memories.

In the illustrated example of FIG. 1, the example reputation data store 102 stores behavioral data of Internet Protocols (IPs) acquired through different data sources. In the illustrated example of FIG. 1, the reputation data store(s) 102 includes three different behavioral data sources: the example email data store 106, the example HTTP data store 108, and the example network data store 109. The example email data store 106, the example HTTP data store 108, and the example network data store 109 include telemetry information corresponding to the respective data types. For example, the email data store 106 includes email telemetry data, the example HTTP data store 108 includes HTTP telemetry data, and the network data store 109 includes network telemetry data. While in examples disclosed herein, email data sources, HTTP data sources, and network data sources are used, any other types of telemetry data may additionally or alternatively be used such as, for example, domain name service (DNS) query information, HyperText Transfer Protocol secure (HTTPS), File Transfer Protocol (FTP) data, etc. Moreover, while in the illustrated example of FIG. 1, the email data store 106, the HTTP data store 108, and the network data store 109 are represented as components of the reputation data store 102, such data stores may be hosted by different entities and/or may be stored at different locations.

In the illustrated example of FIG. 1, the example reputation controller 110 conducts machine learning to generate a model, stores the model, and services requests for the reputation of an IP address received from a client device using the stored model. In the illustrated example of FIG. 1, the reputation controller 110 accesses data from the example reputation data store(s) 102 and processes the data using the example data collector 112, the example label generator 114, the example confidence scorer 116, the example data selector 118, and the example feature identifier 120. The processed data is then used to generate and/or train the machine learning model by using the example model trainer 122 and the example model executor 124. The trained model is then stored in the model data store 126. The trained model is then used by the example model executor 124 and reputation request servicer 128 to respond to a request for a reputation of an IP address sent by the client device 130.

The example data collector 112 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc. The example data collector 112 accesses IP behavioral data from the reputation data store(s) 102. For example, the data collector 112 collects data values from the example email data store 106, the example HTTP data store 108, and/or the example network data store 109. In some examples, the data collector 112 queries the reputation datastore(s) 102 for data when training is to be performed by the model trainer 122 (e.g., in response to an indication that training is to be performed). In some examples, the data collector 112 may access data pushed to the reputation controller 110 from the reputation data store(s) 102. In some examples, the data collector 112 accesses data from other sources, and is not limited to the types of data depicted in FIG. 1 (e.g., data from the HTTP data store 108, the email data store 106, the network data store 109, etc.). In some examples, the data collector 112 collects data including source IP, owner of the IP, and/or any other features that may be used by the particular data source to facilitate calculation of a reputation for a particular IP address.

The example label generator 114 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. In the illustrated example FIG. 1, the example label generator 114 generates a combined label for each IP address included in a first data set (e.g., the HTTP data store) and a second data set (e.g., the email data store). In examples disclosed herein, the combined label(s) are used as an expected output for training of the machine learning model.

The example confidence scorer 116 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. In the illustrated example FIG. 1, the example confidence scorer 116 creates a confidence score indicating a confidence of the label generated by the label generator 114. In examples disclosed herein, the confidence score is represented as a numeric value from zero to one, with higher values (e.g., values closer to one) indicating a higher confidence in the combined label. However, any other range and/or types of values may be used to represent a confidence.

The example data selector 118 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. In the illustrated example FIG. 1, the example data selector 118 selects the data to be used for training a model. In examples disclosed herein, duplicate IP addresses are omitted from the training data. In some examples, combined labels having a value of "unknown" are omitted from the training data.

The example feature identifier 120 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example feature identifier 120 identifies first features from the first data set, and identifies second features from the second data set. The first and second features are later used when training the machine learning model. In examples disclosed herein, the first data set corresponds to an HTTP data set. As a result, the first features associated with the first data set correspond to features of HTTP communications. Such first features may include, for example, a domain of an HTTP request, an originating IP address of the record, a destination IP address of the record, a file size of a response message, geolocation information associated with an IP address of the record, ownership information associated with an IP address of the record, whether an IP address of the record is associated with hosted domains that are related to phishing or malicious activity, etc.

In examples disclosed herein, the second data set corresponds to an email data set (e.g., email telemetry data). As a result, the second features associated with the second data set correspond to features of email communications. Such second features may include, for example, a destination address of an email message, an originating IP address of the email message, a frequency at which messages originate from the originating IP address of the email message, an average file size of messages originating from the IP address of the email message, etc.

In general, features identified by the feature identifier 120 from the first data set and/or the second data set will be features that are simple to extract, are invariant to transformations, and are useful for discrimination of malicious and benign IP addresses. In some examples, further levels of features are identified by the feature identifier. For example, features may be broken into separate time windows (e.g., a 7 day window, a 14 day window, a 30 day window, etc.). Simplifying into separate time periods (e.g., 3 time periods) enables the reputation controller 110 to take advantage of standard weekly behavior cycles that most legitimate email servers exhibit (e.g., a bell curve with the maximum traffic points on Wednesday and the minimum traffic points on the weekend), and are comparing "today's" activity with "this week's" activity and "this month's" activity (e.g., a priori data).

The example model trainer 122 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example model trainer 122 causes the example model executor 124 to process the training data using the machine learning model stored in the model data store 126. In some examples, the model trainer 122 may initialize a model for training (e.g., if no prior model was stored in the example model data store 126). If a prior model previously existed in the model data store 126, the training may resume from the prior model. Resuming training from a prior model may, in some examples, result in a quicker convergence of the model (e.g., more efficient training).

The example model trainer 122 reviews the output of the model executor 124 to determine an amount of error of the machine learning model. For example, the model trainer 122 reviews the outputs of the machine learning model to determine whether the outputs from the model match the combined outputs included in the training dataset. Based on the output of the model, the example model trainer 122 determines whether to continue training. In examples disclosed herein, the example model trainer determines whether to continue training based on whether a calculated amount of error exceeds a threshold amount of error. However, any other approach to determining whether training is complete may additionally or alternatively be used including, for example, k-fold cross validation, split testing, random forest classification, etc.

The example model data store 126 of the illustrated example of FIG. 1 is implemented by any memory, storage device and/or storage disc for storing data such as, for example, flash memory, magnetic media, optical media, solid state memory, hard drive(s), thumb drive(s), etc. Furthermore, the data stored in the example model data store 126 may be in any data format such as, for example, binary data, comma delimited data, tab delimited data, structured query language (SQL) structures, etc. While, in the illustrated example, the model data store 126 is illustrated as a single device, the example model data store 126 and/or any other data storage devices described herein may be implemented by any number and/or type(s) of memories. In the illustrated example of FIG. 1, the example model data store 126 stores one or more model(s) to be used by the example model executor 124 for generation of the indication of whether the IP address (and/or other features provided by the client device 130) are malicious.

In the illustrated example FIG. 1, the example model executor 124 executes the model stored in the model data store 126 using features and/or other information provided by the client device 130 (e.g., via the example reputation request servicer 128). The example model executor 124, as a result of execution of the model, generates an output label indicating whether the information provided in the request represents a malicious request or a benign request. In some examples, a confidence score is generated to enable a determination of a confidence of the output label. Such a confidence score may be used to determine a type of responsive action that is to be performed by the client device 130.

In the illustrated example FIG. 1, the example reputation request servicer 128 receives a request for a reputation of an IP address from the client device 130. In some examples, the reputation request servicer 128 provides the IP address (and/or any other data concerning the reputation request) to the example model executor 124 and returns the reputation (e.g., a reputation score) of the IP address generated by the example model executor 124 to the client device 130.

The example client device 130 of the illustrated example of FIG. 1 is implemented by a computing device such as, for example, a router, a desktop computer, a smartphone, a network node, an Internet appliance, etc. In the illustrated example of FIG. 1, the client device 130 is represented separately from the reputation controller 110. In this manner, the client device 130 (or many different client devices) may communicate with a centralized reputation controller 110 (e.g., operated in the cloud or other computing infrastructure) to request reputation information. However, in some examples, multiple different reputation controllers 110 may be implemented such that the client device 130 communicates with one or more particular reputation controller(s) 110.

Figure 2:
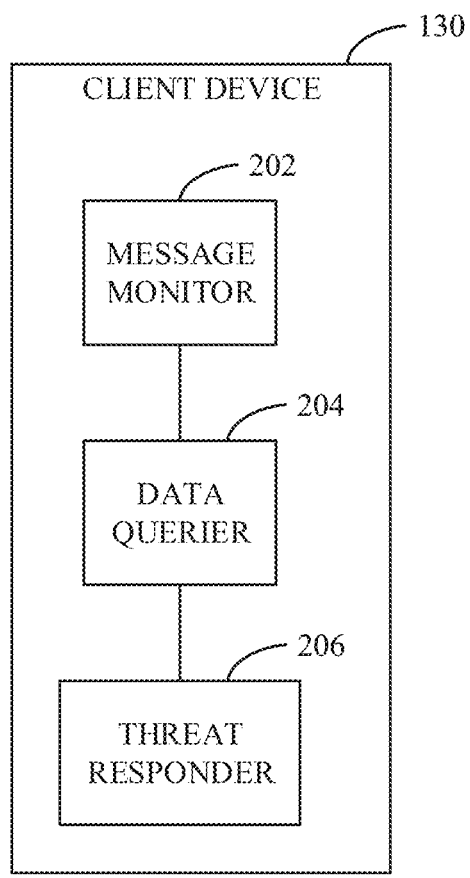
FIG. 2 is a block diagram representation of the client-side portion of the blocks referenced in FIG. 1.

FIG. 2 is a block diagram of an example implementation of the client device 130. The example client device 130 includes an example message monitor 202, an example data querier 204, and an example threat responder 206. In some examples, the reputation controller 110 (or a portion thereof) may be implemented as a component of the client device 130. For example, a model data store 126 and a model executor 124 may additionally or alternatively be implemented at the client device 130, thereby enabling the client device to execute the machine learning model to independently determine reputation information using the model.

The example message monitor 202 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example message monitor 202 accesses a message received at the client device (and/or to be transmitted by the client device). For example, the message could be an email message (e.g., a Simple Mail Transfer Protocol (SMTP) message), a web (e.g., HTTP) request, a DNS query, etc. In examples disclosed herein, the message represents a request received from a device separate from the client device (e.g., a user computer). However, in some examples, the request may represent a message to be transmitted by the client device to another computing device.

The message monitor 202 identifies features associated with the received message. In some examples, features may represent history (e.g., aggregated) information associated with an IP address from which the message was received. In examples disclosed herein, the features identified by the message monitor 202 depend on the type of the message. For example, if the message were an email message, the features may include a destination address of an email message, an originating IP address of the email message, a frequency at which messages originate from the originating IP address of the email message, an average file size of messages originating from the IP address of the email message, etc. If, for example, the message were an HTTP request, the features may include a domain of an HTTP request, an originating IP address of the record, a destination IP address of the record, a file size of a response message, geolocation information associated with an IP address of the record, ownership information associated with an IP address of the record, whether an IP address of the record is associated with hosted domains that are related to phishing or malicious activity, etc.

The example data querier 204 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. In the illustrated example FIG. 2, the example data querier 204 forwards the features to the reputation request servicer 128 of the reputation controller 110 in the form of a query concerning the reputation of the IP from which the message was received. In examples disclosed herein, the query is formatted using a Representational State Transfer (REST) query. However, any other type of query may additionally or alternatively be used.

The example threat responder 206 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The threat responder 206 determines whether the reputation retrieved via the query transmitted by the data querier 204 indicates that the IP originating the message and/or, more generally, the message itself, is malicious. In some examples, the determination of whether the reputation indicates that the originating message is malicious is performed by inspecting the output label (e.g., malicious, benign, etc.). In some examples, a confidence score may be provided to enable the client device 130 to determine whether to perform a responsive action using a threshold level of risk. In this manner, the reputation may be considered malicious when the label indicates that the message is malicious and the confidence score is greater than or equal to a threshold (e.g., 50% confident). If the message is not malicious (e.g., the indication of the reputation is benign), the threat responder 206 takes no further action, and the process terminates. If the message is malicious (e.g., the indication of the reputation is malicious), the example threat responder 206 performs a responsive action to attend to the message. In examples disclosed herein, the responsive action includes blocking the message. However, in some examples, other responsive actions may additionally or alternatively be performed, such as performing a more intensive malware scan of the message to further assess the maliciousness.

While an example manner of implementing the reputation controller 110 is illustrated in FIG. 1, one or more of the elements, processes and/or devices illustrated in FIG. 1 may be combined, divided, re-arranged, omitted, eliminated and/or implemented in any other way. Further, the example data collector 112, the example label generator 114, the example confidence scorer 116, the example data selector 118, the example feature identifier 120, the example model trainer 122, the example model executor 124, the example reputation request servicer 128 and/or, more generally, the example reputation controller 110 may be implemented by hardware, software, firmware and/or any combination of hardware, software and/or firmware. Thus, for example, any of the example data collector 112, the example label generator 114, the example confidence scorer 116, the example data selector 118, the example feature identifier 120, the example model trainer 122, the example model executor 124, the example reputation request servicer 128 and/or, more generally, the example reputation controller 110 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data collector 112, the example label generator 114, the example confidence scorer 116, the example data selector 118, the example feature identifier 120, the example model trainer 122, the example model executor 124, the example reputation request servicer 128 and/or, more generally, the example reputation controller 110 is/are hereby expressly defined to include a non-transitory computer readable storage device or storage disk such as a memory, a digital versatile disk (DVD), a compact disk (CD), a Blu-ray disk, etc. including the software and/or firmware. Further still, the example reputation controller 110 may include one or more elements, processes and/or devices in addition to, or instead of, those illustrated in FIG. 1 and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

While an example manner of implementing the client device 130 of FIG. 1 is illustrated in FIG. 2, one or more of the elements, processes and/or devices illustrated in FIGS. 1 and/or 2 may be combined, divided, re-arranged, omitted, eliminated and/or implemented in any other way. Further, the example message monitor 202, the example data querier 204, the example threat responder 206 and/or, more generally, the example client device 130 may be implemented by hardware, software, firmware and/or any combination of hardware, software and/or firmware. Thus, for example, any of the example message monitor 202, the example data querier 204, the example threat responder 206, and/or, more generally, the example client device 130 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example message monitor 202, the example data querier 204, the example threat responder 206 is/are hereby expressly defined to include a non-transitory computer readable storage device or storage disk such as a memory, a digital versatile disk (DVD), a compact disk (CD), a Blu-ray disk, etc. including the software and/or firmware. Further still, the example client device 130 may include one or more elements, processes and/or devices in addition to, or instead of, those illustrated in FIGS. 1 and 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the reputation controller 110 and/or the client device 130 of FIGS. 1 and 2 are shown in FIGS. 3, 4, 6, and 7. The machine readable instructions may be one or more executable programs or portion(s) of an executable program for execution by a computer processor such as the processors 712 and/or 812 shown in the example processor platforms 800 and/or 900 discussed below in connection with FIGS. 8 and 9. The program may be embodied in software stored on a non-transitory computer readable storage medium such as a CD-ROM, a floppy disk, a hard drive, a DVD, a Blu-ray disk, or a memory associated with the processors 712 and/or 812, but the entire program and/or parts thereof could alternatively be executed by a device other than the processors 712 and/or 812 and/or embodied in firmware or dedicated hardware. Further, although the example program is described with reference to the flowcharts illustrated in FIGS. 3, 4, 6, and 7, many other methods of implementing the example reputation controller 110 and/or the example client device 130 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3, 4, 6, and 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 3:
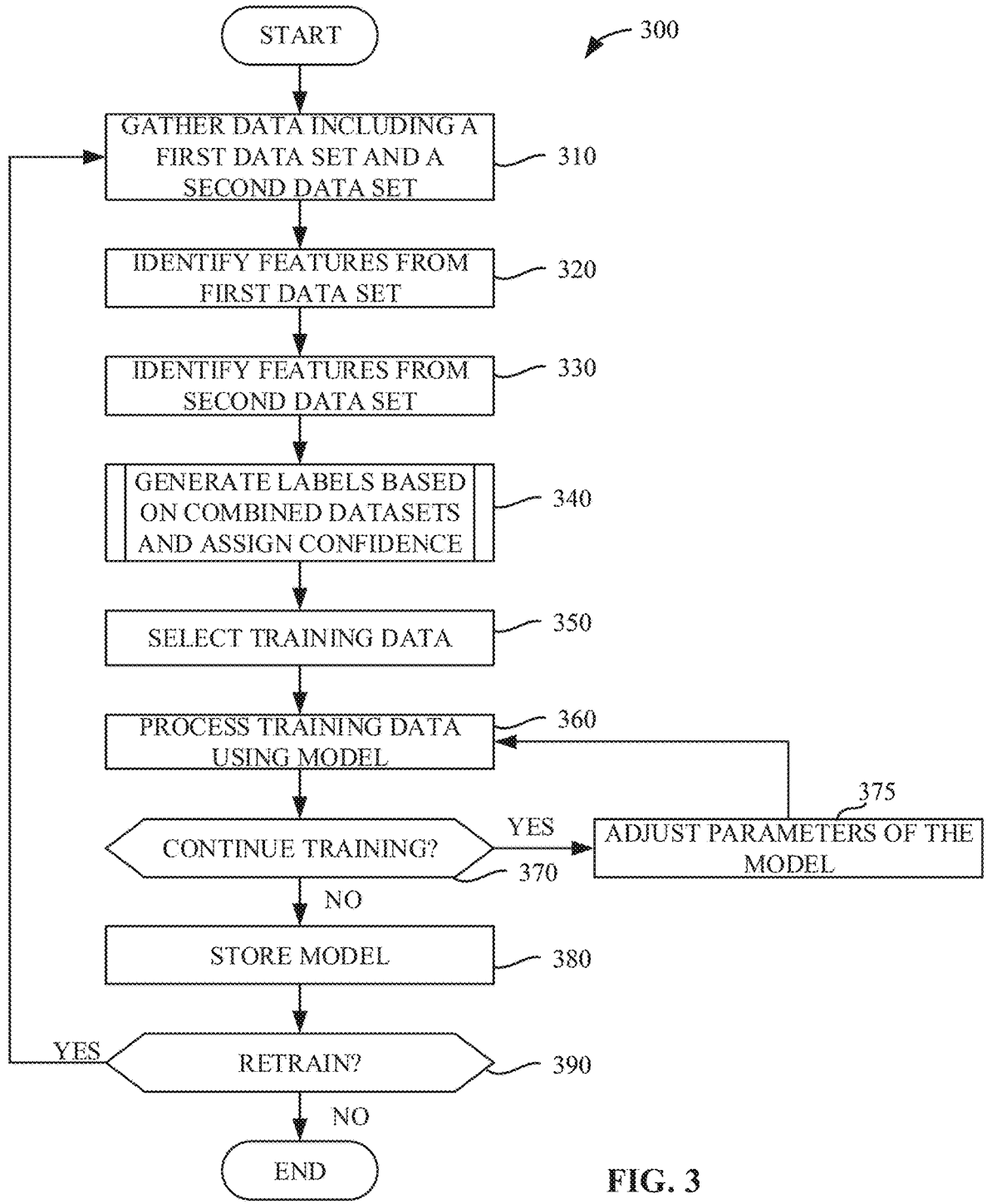
FIG. 3 is a flowchart representative of example machine readable instructions which may be executed to implement the reputation controller of FIG. 1.

FIG. 3 is a flowchart representative of an example process 300 that may be executed to implement the example reputation controller 110 of FIG. 1 to generate a machine-learning model to generate an IP reputation score through cross-protocol analysis. The example process 300 of FIG. 3 begins when the data collector 112 collects data from the reputation data store(s) 102. (Block 310). In examples disclosed herein, the gathered data includes a first data set and a second data set. In examples disclosed herein, the first data set corresponds to an HTTP data set, and the second data set corresponds to an email data set. However, any other data sets may additionally or alternatively be used. In examples disclosed herein, the first data set and the second data set are pre-labeled. That is, each record in the first data set and the second data set includes a corresponding indication of whether the record is malicious, benign, or unknown. In some examples, an additional confidence value is included with each label.

The example feature identifier 120 identifies first features from the first data set. (Block 320). The first features are later used when training the machine learning model. In examples disclosed herein, the first data set corresponds to an HTTP data set. As a result, the first features associated with the first data set correspond to features of HTTP communications. Such first features may include, for example, a domain of an HTTP request, an originating IP address of the record, a destination IP address of the record, a file size of a response message, geolocation information associated with an IP address of the record, ownership information associated with an IP address of the record, whether an IP address of the record is associated with hosted domains that are related to phishing or malicious activity, etc.

The example feature identifier 120 identifies second features from the second data set. (Block 330). The second features are later used when training the machine learning model. In examples disclosed herein, the second data set corresponds to an email data set (e.g., email telemetry data). As a result, the second features associated with the second data set correspond to features of email communications. Such second features may include, for example, a destination address of an email message, an originating IP address of the email message, a frequency at which messages originate from the originating IP address of the email message, an average file size of messages originating from the IP address of the email message, etc.

In general, features identified from the first data set and/or the second data set will be features that are simple to extract, are invariant to transformations, and are useful for discrimination of malicious and benign IP addresses. In some examples, further levels of features are identified. For example, features may be broken into separate time windows (e.g., a 7 day window, a 14 day window, a 30 day window, etc.). Simplifying into separate time periods (e.g., 3 time periods) enables the reputation controller 110 to take advantage of standard weekly behavior cycles that most legitimate email servers exhibit (e.g., a bell curve with the maximum traffic points on Wednesday and the minimum traffic points on the weekend), and are comparing "today's" activity with "this week's" activity and "this month's"

activity (e.g., a priori data). Aberrant behavior is a strong sign of a compromise or infection, which is the type of issue that would trigger an all-port block, while an IP address that is a legitimate business, gateway or shared IP space will tend to have a more consistent flow. A shared or gateway IP that can send both legitimate and illegitimate mail tends to have consistent mailflow with spikes, but rounding that into the week and month views will reduce the likelihood of multi-day false positives on such IP addresses which have historically required many hours to identify and manually classify such IP addresses.

The label generator 114 and the confidence scorer 116 generate combined labels and corresponding confidence scores, respectively. (Block 340). An example approach for generating the combined labels and confidence scores is disclosed in further detail in connection with FIG. 4. A result of the label generator 114 and the confidence scorer 116 is a training data set including the combined label, the confidence, and any features from the first data set and the second data set. In this manner, the training data set is created based on both the first data set and the second data set. Such an approach enables later incoming requests for one type of data (e.g., data that would otherwise correspond to the first data set) to benefit from information included in the training data set that would otherwise correspond to the second data set.

The data selector 118 selects the training data to be used for model training. (Block 350). In some examples, a portion of the training data is reserved for validation purposes. In some examples, the data selector 118 filters the training data to include only training data that resulted in a label of malicious or benign. That is, data that is labeled as unknown may be omitted from the training data for training purposes.

The example model trainer 122 causes the example model executor 124 to process the training data using the machine learning model stored in the model data store 126. (Block 360). In some examples, the model trainer 122 may initialize a model for training (e.g., if no prior model was stored in the example model data store 126). If a prior model previously existed in the model data store 126, the training may resume from the prior model. Resuming training from a prior model may, in some examples, result in a quicker convergence of the model (e.g., more efficient training). The example model trainer 122 reviews the output of the model executor 124 to determine an amount of error of the machine learning model. For example, the model trainer 122 reviews the outputs of the machine learning model to determine whether the outputs from the model match the combined outputs included in the training dataset.

The example model trainer 122 determines whether to continue training. (Block 370). In examples disclosed herein, the example model trainer determines whether to continue training based on whether the calculated amount of error (e.g., determined at block 360) exceeds a threshold amount of error. However, any other approach to determining whether training is complete may additionally or alternatively be used including, for example, k-fold cross validation, split testing, random forest classification, etc. If model training is to continue (e.g., block 370 returns a result of YES), the example model trainer 122 adjusts parameters of the machine learning model. (Block 375). In some examples, the amount of adjustment to the parameters of the machine learning model is based on the calculated amount of error (e.g., using stochastic gradient descent). However, any other approach for adjusting parameters of a model may additionally or alternatively be used. Control then proceeds to block 360, where the process of blocks 360 through 375 is repeated until the calculated amount of error is less than the threshold amount of error (e.g., until block 370 returns a result of NO). In some examples, additional and/or alternative conditions may be evaluated to determine whether to continue training such as, for example, a number of training iterations performed, an amount of time elapsed since the initiation of the training process, etc.

After completion of the training (e.g., upon block 370 returning a result of NO), the example model trainer 122 stores the model in the model data store 126. (Block 380). In this manner, the model may then be used by the example model executor 124 at the request of the reputation request receiver 128.

The model trainer 122 determines if the model requires retraining. (Block 390). Retraining enables the reputation controller 110 to perform additional training periodically (e.g., hourly, daily, weekly, etc.) and/or a-periodically (e.g., in response to a request for re-training). If the model is to be retrained, control proceeds to block 310, where the process of block 310 to 390 is repeated. If the model is not to be retrained (e.g., block 390 returns a result of NO), the example process 300 of FIG. 3 terminates.

Figure 4:
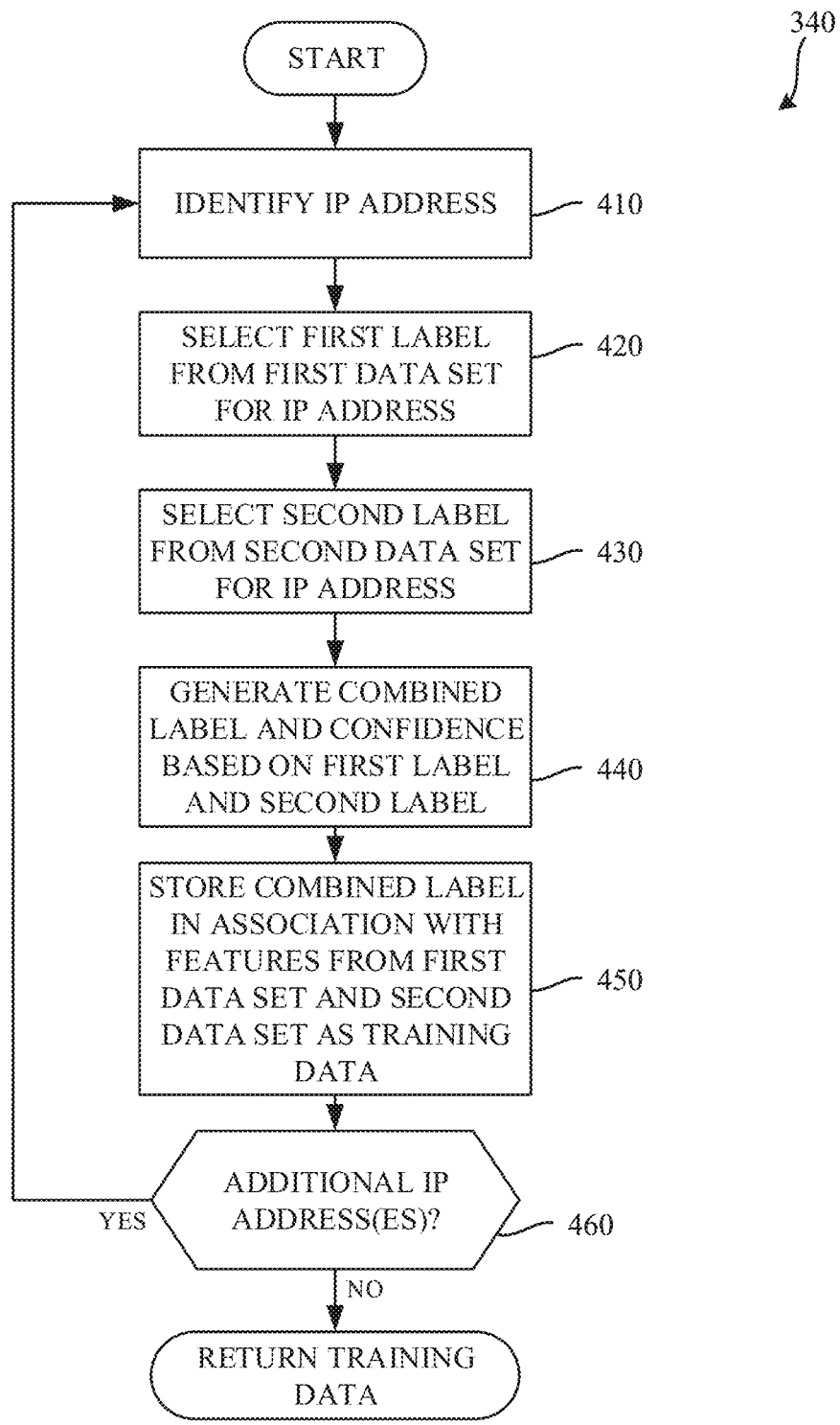
FIG. 4 is a flowchart representative of example machine readable instructions which, when executed, cause the reputation controller of FIG. 1 to generate a label and confidence score.

FIG. 4 is a flowchart representative of example machine readable instructions 340 which, when executed, cause the reputation controller of FIG. 1 to generate a label and confidence score. The example process 340 of FIG. 4 begins when the example label generator 114 identifies an IP address for records appearing in both the first data set and the second data set. (Block 410). The example label generator 114 selects a first label from the first data set for the IP address. (Block 420). In some examples, the selection of the label from the first data set includes comparison of one or more features within the first data set to one or more thresholds. For example, in the context of HTTP data, a published reputation score field is included in the data set. The published reputation score field is compared to a first threshold (e.g., a reputation score of 30) and/or a second threshold (e.g., a reputation score of 14) to determine whether the HTTP record is malicious (e.g., a reputation score greater than or equal to the first threshold), benign (e.g., a reputation score less than the second threshold), or unknown (e.g., a reputation score greater than or equal to the second threshold and less than the first threshold).

The example label generator 114 selects a second label from the second data set for the IP address. (Block 430). In some examples, the selection of the label from the second data set includes comparison of one or more features within the second data set to one or more thresholds. For example, in the context of email telemetry data, an email reputation score field is included in the data set. The email reputation score field is compared to a third threshold (e.g., a reputation score of 0.8) and/or a fourth threshold (e.g., a reputation score of 0.1) to determine whether the email telemetry record is malicious (e.g., a reputation score greater than or equal to the third threshold), benign (e.g., a reputation score less than the fourth threshold), or unknown (e.g., a reputation score greater than or equal to the fourth threshold and less than the third threshold).

The example label generator 114 and confidence scorer 116 generate a combined label for the IP and assign the combined label a confidence label, respectively (Block 440). In this manner, the first label (from the first data source) is combined with the second label (from the second data source). In examples disclosed herein, a lookup table is used to identify a combined label based on the first label and the second label. An example look up table 500 shown in FIG. 5 illustrates input labels and corresponding combined labels and confidence scores. While a look up table is used in the illustrated example of FIGS. 4 and/or 5, any other approach to generating a combined label and confidence score may additionally or alternatively be used.

The example table 500 of FIG. 5 includes a first label column 504, a second label column 506, a combined label column 508, and a label confidence column 510. The first label column 504 represents a first label (e.g., from the first data set). The second label column 506 represents a second label (e.g., from the second data set). The combined label column 508 represents an output combined label to be used for subsequent training purposes. The example label confidence column 510 represents a confidence label corresponding to the output combined label. The label columns use three values: benign, malicious, and unknown. However, any other label values may additionally or alternatively be used. The label confidence column uses a numeric value from zero to one, with higher values (e.g., values closer to one) indicating a higher confidence in the combined label.

In examples disclosed herein, where two different data sets having three label possibilities are used, nine different combinations of labels are possible. However, any number of combinations may additionally or alternatively be used. For example, a first row 521 of the example table 500 of FIG. 5 indicates scenario where the first label is benign and the second label is benign. As a result, the combined label of the first row 520 is benign with a confidence of one.

A second row 522 of the example table 500 of FIG. 5 indicates a scenario where the first label is malicious and the second label is malicious. As a result, the combined label of the second row 522 is malicious with a confidence of one.

A third row 523 of the example table 500 of FIG. 5 indicates a scenario where the first label is unknown and the second label is unknown. As a result, the combined label of the third row 523 is unknown with a confidence of one.

A fourth row 524 of the example table 500 of FIG. 5 indicates a scenario where the first label is benign and the second label is unknown. As a result, the combined label of the fourth row 524 is benign with a confidence of one half.

A fifth row 525 of the example table 500 of FIG. 5 indicates a scenario where the first label is malicious and the second label is unknown. As a result, the combined label of the fifth row 525 is malicious with a confidence of one half.

A sixth row 526 of the example table 500 of FIG. 5 indicates a scenario where the first label is unknown and the second label is benign. As a result, the combined label of the sixth row 526 is benign with a confidence of one half.

A seventh row 527 of the example table 500 of FIG. 5 indicates a scenario where the first label is unknown and the second label is malicious. As a result, the combined label of the seventh row 527 is malicious with a confidence of one half.

An eighth row 528 of the example table 500 of FIG. 5 indicates a scenario where the first label is benign and the second label is malicious. As a result, the combined label of the eighth row 528 is unknown with a confidence of one half.

A ninth row 529 of the example table 500 of FIG. 5 indicates a scenario where the first label is malicious and the second label is benign. As a result, the combined label of the ninth row 529 is unknown with a confidence of one half.

Returning to FIG. 4, upon determining the combined label and confidence score (at block 440), the example label generator 114 stores the combined label and confidence score in association with features from the first data set and features from the second data set in a training data set. (Block 450). In this manner, the training set includes only information where an IP address is common to both the first data set and the second data set. Such an approach enables training to take place cross-protocol data, rather than being limited to a single protocol/data set.

The example label generator 114 determines whether any additional IP addresses exist in the first data set and the second data set for inclusion in the training data set. (Block 460). If additional IP addresses exist (Block 460 returns a result of YES), control proceeds to block 410 where the process of blocks 410 through block 460 is repeated until no additional IP addresses exist for inclusion in the training data set. Control then returns to block 350 of FIG. 3.

Figure 6:
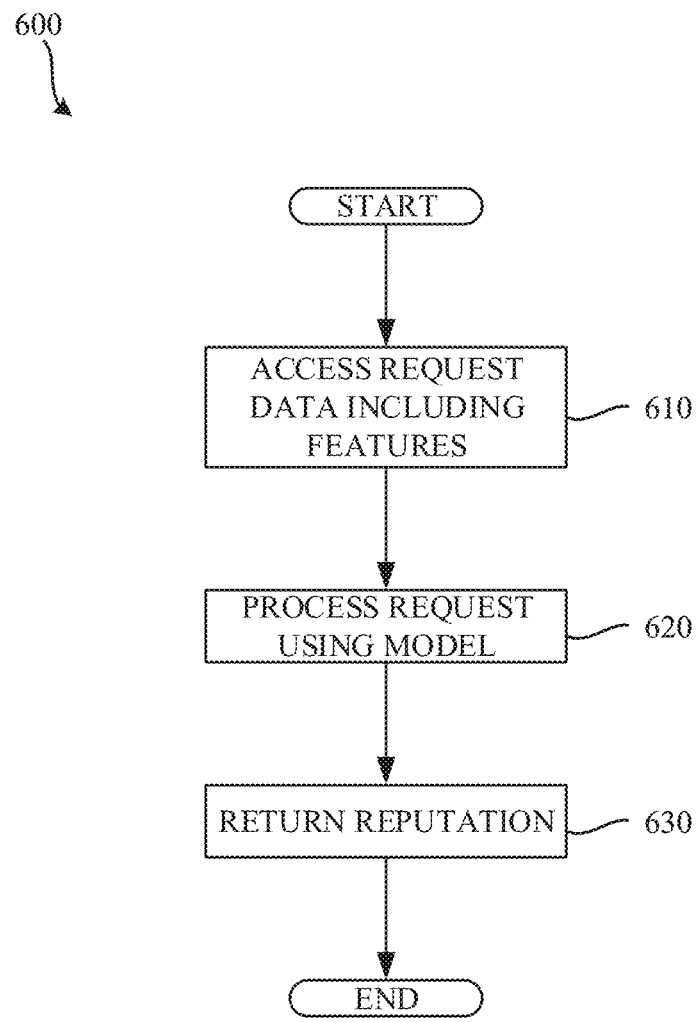
FIG. 6 is a flowchart representative of example machine readable instructions which may be executed to implement the reputation controller of FIG. 1 to process a request for reputation information.

FIG. 6 is a flowchart representative of example machine readable instructions which may be executed to implement the reputation controller 110 of FIG. 1 to process a request for reputation information. The example process 600 of FIG. 6 corresponds to the inference phase of the machine learning process, where the reputation controller 110 receives a request, processes the request, and replies to a client device 130 that made the request with the information requested by the client device 130.

The example process 600 of FIG. 6 begins when the example reputation request servicer 128 receives a request from a client device. (Block 610). In examples disclosed herein, the request includes features identified by the client device 130 that are to be used when processing the request.

The model executor 124 receives the features provided via the reputation request servicer 128 and processes the features using the model stored in the model data store 126. (Block 620). As a result of the execution of the model, the model executor 124 generates an output label and a confidence score.

The reputation request servicer 128 provides the generated output label and, in some examples, the confidence score to the requesting client device 130. (Block 630). The process 600 of FIG. 6 then terminates, but may be performed upon, for example, a subsequent request from a client device.

Figure 7:
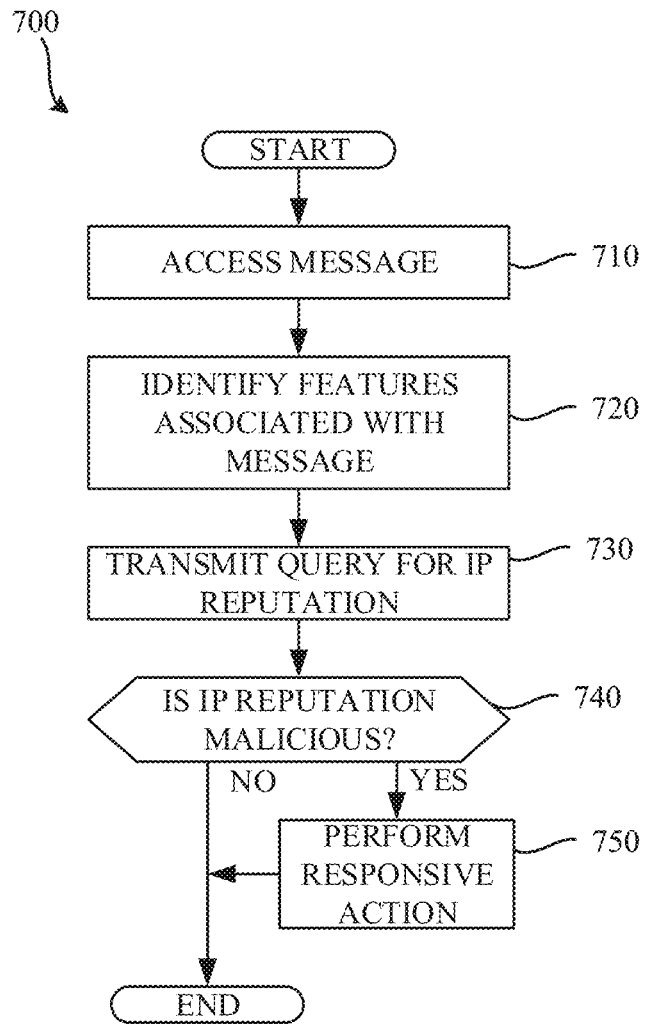
FIG. 7 is a flowchart representative of example machine readable instructions which may be executed to implement the client device of FIGS. 1 and/or 2 to request reputation information.

FIG. 7 is a flowchart representative of example machine readable instructions which may be executed to implement the client device of FIGS. 1 and/or 2 to request reputation information. The example process 700 of FIG. 7 represents the client device 130 requesting an IP reputation score from the reputation controller 110. The example process 700 of FIG. 7 begins when the message monitor 202 accesses a message. (Block 710). For example, the request could be an email message (e.g., a Simple Mail transfer Protocol (SMTP) message), a web (e.g., HTTP) request, a DNS query, etc. In examples disclosed herein, the message represents a request received from a device separate from the client device (e.g., a user computer). However, in some examples, the message may represent a message to be transmitted by the client device to another computing device.

The message monitor 202 identifies features associated with the received message. (Block 720). In some examples, features may represent history (e.g., aggregated) information associated with an IP address from which the message was received. In examples disclosed herein, the features identified by the message monitor 202 depend on the type of the message. For example, if the message were an email message, the features may include a destination address of an email message, an originating IP address of the email message, a frequency at which messages originate from the originating IP address of the email message, an average file size of messages originating from the IP address of the email message, etc. If, for example, the message were an HTTP request, the features may include a domain of an HTTP request, an originating IP address of the record, a destination IP address of the record, a file size of a response message, geolocation information associated with an IP address of the record, ownership information associated with an IP address of the record, whether an IP address of the record is associated with hosted domains that are related to phishing or malicious activity, etc.

The data querier 204 forwards the features to the reputation request servicer 128 of the reputation controller 110 in the form of a query concerning the reputation of the IP from which the message was received. (Block 730). In response to the query, the reputation controller 110 determines the reputation of the IP address using the provided features and replies to the data querier 204 with the indication of the reputation. In examples disclosed herein, the indication of the reputation is provided to the client device as an output label (e.g., malicious, benign, etc.).

The threat responder 206 determines whether the reputation indicates that the IP originating the message is malicious. (Block 740). In some examples, the determination of whether the reputation indicates that the originating message is malicious is performed by inspecting the output label (e.g., malicious, benign, etc.). In some examples, a confidence score may be provided to enable the client device to determine whether to perform a responsive action using a threshold level of risk. In this manner, the reputation may be considered malicious when the label indicates that the message is malicious and the confidence score is greater than or equal to a threshold (e.g., 50% confident). If the message is not malicious (e.g., the indication of the reputation is benign) (block 740 returns a result of NO), the threat responder 206 takes no further action, and the process terminates. If the message is malicious (e.g., the indication of the reputation is malicious), the example threat responder 206 performs a responsive action to attend to the message. (Block 750). In examples disclosed herein, the responsive action includes blocking the message. However, in some examples, other responsive actions may additionally or alternatively be performed, such as performing a more intensive malware scan of the message to further assess the maliciousness. After the responsive action has been completed, the example process 700 of FIG. 7 terminates, but may be repeated upon receipt of a subsequent message.

Figure 8:
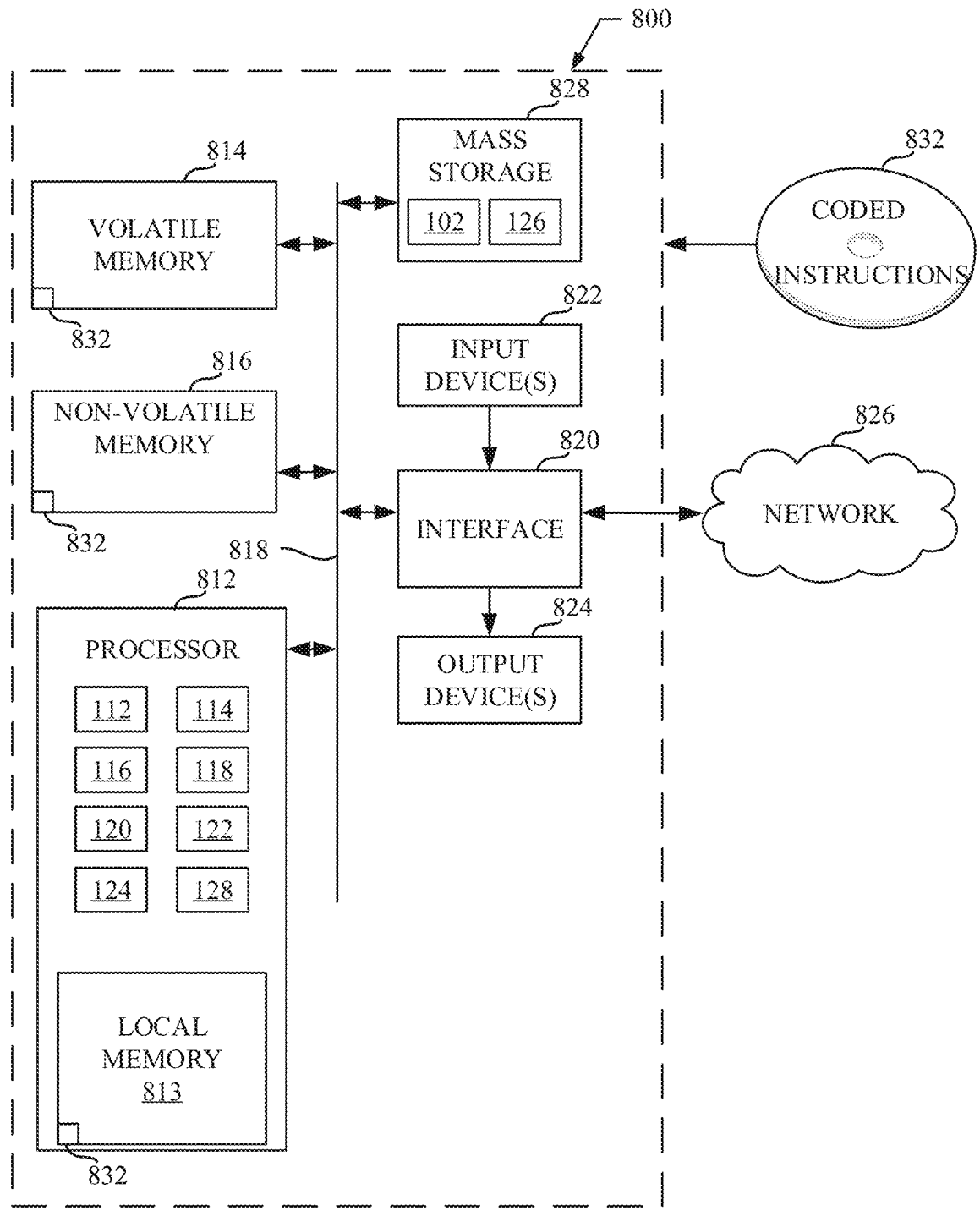
FIG. 8 is a block diagram of an example processing platform structured to execute the instructions of FIGS. 3, 4, and 6 to implement the example reputation controller of FIG. 1.

FIG. 8 is a block diagram of an example processor platform 800 structured to execute the instructions of FIGS. 3, 4, and/or 6 to implement the reputation controller 110 of FIG. 1. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data collector 112, the example label generator 114, the example confidence scorer 116, the example data selector 118, the example feature identifier 120, the example model trainer 122, the example model executor 124 and the example reputation request servicer 128.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives. The example mass storage device(s) 828 of FIG. 8 implement the example reputation data store 102 and/or the example model data store 126.

The machine executable instructions 832 of FIGS. 3, 4, and 6 may be stored in the mass storage device 828, in the volatile memory 814, in the non-volatile memory 816, and/or on a removable non-transitory computer readable storage medium such as a CD or DVD.

Figure 9:
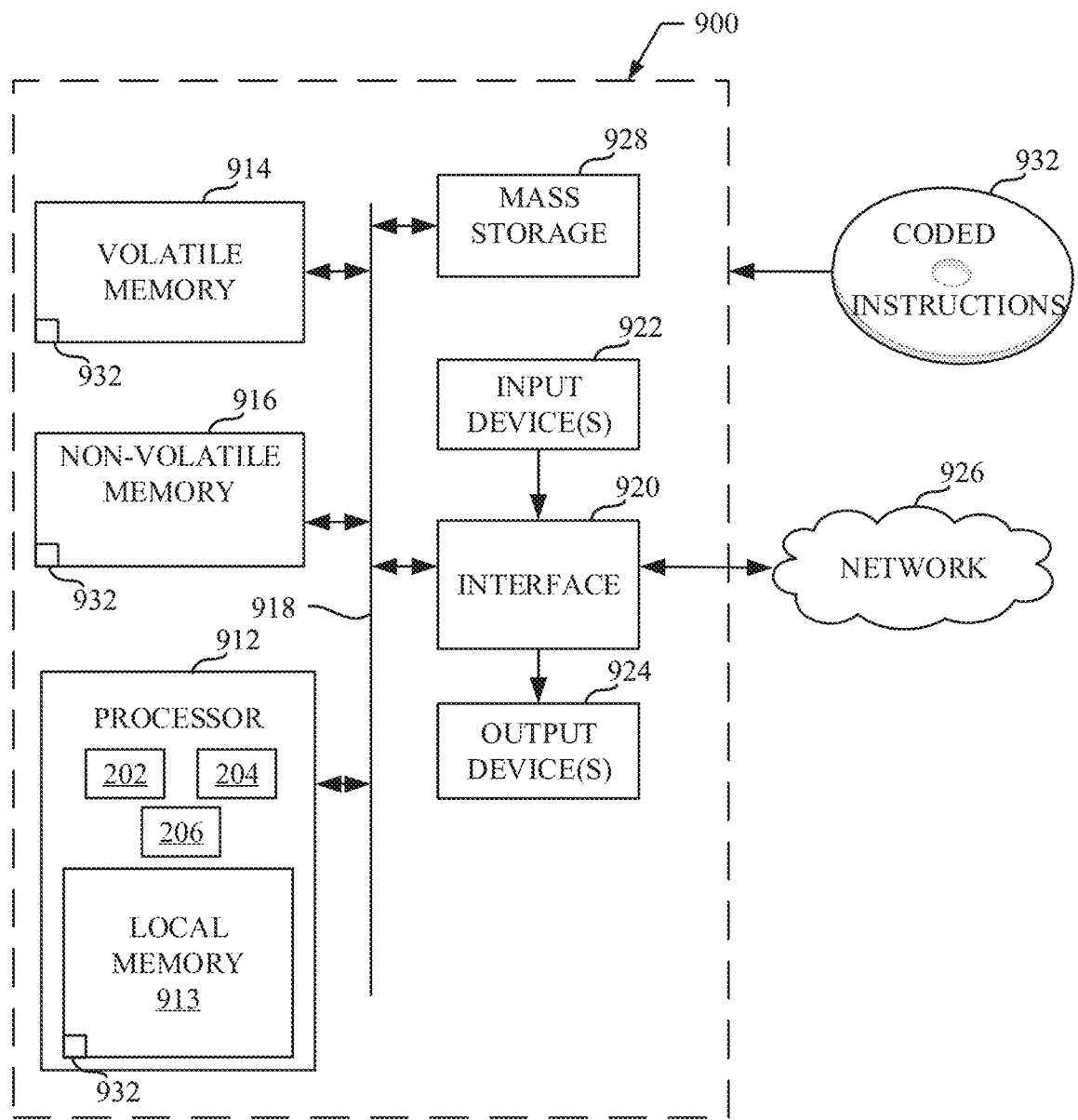
FIG. 9 is a block diagram of an example processing platform structured to execute the instructions of FIG. 7 to implement the example client device of FIG. 4.

FIG. 9 is a block diagram of an example processor platform 800 structured to execute the instructions of FIG. 7 to implement the client device 130 of FIGS. 1 and/or 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example message monitor 202, the example data querier 204, and the example threat responder 206.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 7 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that improve the process of protecting internet-enabled devices from malicious IP sources through cross-protocol analysis. The disclosed methods, apparatus and articles of manufacture improve the efficiency of IP reputation by conducting cross-protocol analysis of multiple IP behavioral data sources and providing generic IP reputations to IP sources dependent upon the behavior displayed by specified IPs across the different protocols through machine learning. The disclosed methods, apparatus and articles of manufacture are accordingly directed to one or more improvement(s) in the functioning of a computer.

Example 1 includes an apparatus for determining whether an Internet Protocol (IP) address is malicious, the apparatus comprising a data collector to gather a first data set representing Internet Protocol (IP) telemetry data for a first protocol, the data collector to gather a second data set representing IP telemetry data for a second protocol different from the first protocol, a label generator to generate a training data set based on records in the first data set and the second data set having matching IP addresses, the training data set to include combined labels indicating whether each of the respective matching IP addresses is malicious, a model trainer to train a machine learning model using the training data set, and a model executor to, responsive to a request from a client device, execute the machine learning model to determine whether a requested IP address is malicious.

Example 2 includes the apparatus of example 1, further including a data selector to filter the training data set prior to use of the training data set for training.

Example 3 includes the apparatus of example 1, wherein the first data set represents hypertext transfer protocol (HTTP) telemetry data.

Example 4 includes the apparatus of example 3, wherein the second data set represents email telemetry data.

Example 5 includes the apparatus of example 1, further including a feature identifier to generate derive a combined feature from the first data set and the second data set to create the training data set.

Example 6 includes the apparatus of example 1, further including a confidence scorer to generate a confidence score associated with the combined label.

Example 7 includes the apparatus of example 6, wherein the confidence score is used as an expected output when training the machine learning model.

Example 8 includes the apparatus of example 1, further including a reputation request servicer to provide an indication of whether the requested IP address is malicious to the client device.

Example 9 includes at least one non-transitory machine-readable storage medium comprising instructions that, when executed, cause at least one processor to at least gather a first data set representing Internet Protocol (IP) telemetry data for a first protocol, gather a second data set representing IP telemetry data for a second protocol different from the first protocol, generate a training data set based on records in the first data set and the second data set having matching IP addresses, the training data set to include combined labels indicating whether each of the corresponding matching IP addresses is malicious, train a machine learning model using the training data set, and responsive to a request from a client device, execute the machine learning model to determine whether a requested IP address is malicious.

Example 10 includes the at least one storage medium of example 9, wherein the first data set represents hypertext transfer protocol (HTTP) telemetry data.

Example 11 includes the at least one storage medium of example 10, wherein the second data set represents email telemetry data.

Example 12 includes the at least one storage medium of example 9, wherein the instructions, when executed, further cause the at least one processor to derive a combined feature from the first data set and the second data set.

Example 13 includes the at least one storage medium of example 9, wherein the instructions, when executed, further cause the at least one processor to generate a confidence score associated with the combined label.

Example 14 includes the at least one storage medium of example 13, wherein the confidence score is used as an expected output when training the machine learning model.

Example 15 includes the at least one storage medium of example 9, wherein the instructions, when executed, further cause the at least one processor to provide an indication of whether the requested IP address is malicious.

Example 16 includes a method for determining whether an IP address is malicious, the method comprising gathering a first data set representing Internet Protocol (IP) telemetry data for a first protocol, gathering a second data set representing IP telemetry data for a second protocol different from the first protocol, generating, by executing an instruction with at least one processor, a training data set based on records in the first data set and the second data set having matching IP addresses, the training data set to include combined labels indicating whether each of the corresponding matching IP addresses is malicious, training a machine learning model using the training data set, and responsive to a request from a client device, executing the machine learning model to determine whether a requested IP address is malicious.

Example 17 includes the method of example 16, wherein the first data set represents hypertext transfer protocol (HTTP) telemetry data.

Example 18 includes the method of example 17, wherein the second data set represents email telemetry data.

Example 19 includes the method of example 16, wherein the generating of the training data set includes deriving a combined feature from the first data set and the second data set.

Example 20 includes the method of example 16, wherein the generating of the training data set includes generating a confidence score associated with the combined label.

Example 21 includes the method of example 20, wherein the confidence score is used as an expected output when training the machine learning model.

Example 22 includes the method of example 16, further including providing an indication of whether the requested IP address is malicious.

Example 23 includes an apparatus for determining whether an IP address is malicious, the apparatus comprising means for gathering a first data set representing Internet Protocol (IP) telemetry data for a first protocol, the means for gathering to gather a second data set representing IP telemetry data for a second protocol different from the first protocol, means for generating a training data set based on records in the first data set and the second data set having matching IP addresses, the training data set to include combined labels indicating whether each of the corresponding matching IP addresses is malicious, means for training a machine learning model using the training data set, and means for executing to, responsive to a request from a client device, execute the machine learning model to determine whether a requested IP address is malicious. The example means for gathering is implemented by the example data collector 112. The example means for generating is implemented by the example label generator 114. The example means for training is implemented by the example model trainer 122. The example means for executing is implemented by the model executor 124.

Example 24 includes the apparatus of example 23, wherein the first data set represents hypertext transfer protocol (HTTP) telemetry data.

Example 25 includes the apparatus of example 24, wherein the second data set represents email telemetry data.

Example 26 includes the apparatus of example 23, further including means for deriving a combined feature from the first data set and the second data set. The means for deriving is implemented by the example feature identifier 120.

Example 27 includes the apparatus of example 23, further including means for creating a confidence score associated with the combined label. The example means for creating is implemented by the confidence scorer 116.

Example 28 includes the apparatus of example 27, wherein the confidence score is used as an expected output when training the machine learning model.

Example 29 includes the apparatus of example 23, further including means for providing an indication of whether the requested IP address is malicious. The example means for providing is implemented by the example reputation request servicer 128.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
memory; and
a processor to execute instructions to at least:
identify first features from a first data set and second features from a second data set, the first data set representing Internet Protocol (IP) telemetry data for a HyperText Transfer Protocol (HTTP) protocol, the second data set representing IP telemetry data for an email protocol;
separate the first features and the second features into separate time windows, the separate time windows to include at least one of a daily time window, a weekly time window, and a monthly time window;
execute, responsive to a request from a client device, a machine learning model to output, based on the first features and the second features, a first value indicating whether a requested IP address is malicious, benign, or unknown;
generate a second value separate from the first value, the second value representing a confidence that the first value is correct; and
provide the first value and the second value to the client device, the providing of the first value and the second value to the client device to enable the client device to block a message corresponding to the IP address in response to the first value satisfying a first threshold and the second value satisfying a second threshold.

2. The apparatus of claim 1, wherein the processor is to execute the instructions to generate a training data set based on records in the first data set and the second data set having matching IP addresses.

3. The apparatus of claim 2, wherein the processor is to execute the instructions to train the machine learning model based on the training data set.

4. The apparatus of claim 3, wherein the processor is to execute the instructions to use the second value as an expected output when training the machine learning model.

5. The apparatus of claim 2, wherein the training data set includes combined labels indicating whether each of the matching IP addresses is malicious, benign, or unknown.

6. The apparatus of claim 5, wherein the processor is to execute the instructions to generate the combined labels from the first data set and the second data set.

7. The apparatus of claim 1, wherein the processor is to execute the instructions to provide an indication of whether the requested IP address is malicious, benign, or unknown.

8. At least one non-transitory computer readable storage medium comprising instructions that, when executed, cause at least one processor to at least:
identify first features from a first data set and second features from a second data set, the first data set representing Internet Protocol (IP) telemetry data for a HyperText Transfer Protocol (HTTP) protocol, the second data set representing IP telemetry data for an email protocol;
separate the first features and the second features into separate time windows, the separate time windows to include at least one of a daily time window, a weekly time window, and a monthly time window;
execute, responsive to a request from a client device, a machine learning model to output, based on the first features and the second features, a first value indicating whether a requested IP address is malicious, benign, or unknown;
generate a second value separate from the first value, the second value representing a confidence that the first value is correct; and
provide the first value and the second value to the client device, the providing of the first value and the second value to the client device to enable the client device to block a message corresponding to the IP address in response to the first value satisfying a first threshold and the second value satisfying a second threshold.

9. The at least one non-transitory computer readable storage medium of claim 8, wherein the instructions, when executed, further cause the at least one processor to execute the instructions to generate a training data set based on records in the first data set and the second data set having matching IP addresses.

10. The at least one non-transitory computer readable storage medium of claim 9, wherein the instructions, when executed, further cause the at least one processor to train the machine learning model based on the training data set.

11. The at least one non-transitory computer readable storage medium of claim 10, wherein the instructions, when executed, further cause the at least one processor to use the second value as an expected output when training the machine learning model.

12. The at least one non-transitory computer readable storage medium of claim 9, wherein the training data set includes combined labels indicating whether each of the matching IP addresses is malicious, benign, or unknown.

13. The at least one non-transitory computer readable storage medium of claim 12, wherein the instructions, when executed, further cause the at least one processor to generate the combined labels from the first data set and the second data set.

14. The at least one non-transitory computer readable storage medium of claim 8, wherein the instructions, when executed, further cause the at least one processor to provide an indication of whether the requested IP address is malicious, benign, or unknown.

15. An apparatus comprising:
means for identifying first features from a first data set and second features from a second data set, the first data set representing Internet Protocol (IP) telemetry data for a HyperText Transfer Protocol (HTTP) protocol, the second data set representing IP telemetry data for an email protocol;
means for separating the first features and the second features into separate time windows, the separate time windows to include at least one of a daily time window, a weekly time window, and a monthly time window;
means for executing, responsive to a request from a client device, a machine learning model to output, based on the first features and the second features, a first value indicating whether a requested IP address is malicious, benign, or unknown;
means for generating a second value separate from the first value, the second value representing a confidence that the first value is correct; and
means for providing the first value and the second value to the client device, the providing of the first value and the second value to the client device to enable the client device to block a message corresponding to the IP address in response to the first value satisfying a first threshold and the second value satisfying a second threshold.

16. The apparatus of claim 15, further including means for generating a training data set based on records in the first data set and the second data set having matching IP addresses.

17. The apparatus of claim 16, further including means for training the machine learning model based on the training data set.

18. The apparatus of claim 17, wherein the means for training is to use the second value as an expected output when training the machine learning model.

19. The apparatus of claim 17, further including means for filtering the training data set prior to use of the training data set for training.

20. The apparatus of claim 15, further including means for providing an indication of whether the requested IP address is malicious, benign, or unknown.

* * * * *

UNITED STATES PATENT AND TRADEMARK OFFICE
CERTIFICATE OF CORRECTION

| | |
|---|---|
| PATENT NO. | : 11,743,276 B2 |
| APPLICATION NO. | : 17/356464 |
| DATED | : August 29, 2023 |
| INVENTOR(S) | : Wosotowsky et al. |

It is certified that error appears in the above-identified patent and that said Letters Patent is hereby corrected as shown below:

On the Title Page

Item (54), and in the Specification, Column 1, Lines 1-4, under Title, delete "METHODS, SYSTEMS, ARTICLES OF MANUFACTURE AND APPARATUS FOR PRODUCING GENERIC IP REPUTATION THROUGH CROSS PROTOCOL ANALYSIS" and insert --METHODS, SYSTEMS, ARTICLES OF MANUFACTURE AND APPARATUS FOR PRODUCING GENERIC IP REPUTATION THROUGH CROSS-PROTOCOL ANALYSIS--

Signed and Sealed this
Seventeenth Day of October, 2023

Katherine Kelly Vidal
*Director of the United States Patent and Trademark Office*